US012505615B2

(12) United States Patent
Wang et al.

(10) Patent No.: US 12,505,615 B2
(45) Date of Patent: Dec. 23, 2025

(54) GENERATING THREE-DIMENSIONAL MODELS USING MACHINE LEARNING MODELS

(71) Applicant: Lemon Inc., Grand Cayman (KY)

(72) Inventors: Peng Wang, Los Angeles, CA (US); Yichun Shi, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 211 days.

(21) Appl. No.: 18/520,378

(22) Filed: Nov. 27, 2023

(65) Prior Publication Data

US 2025/0173958 A1    May 29, 2025

(51) Int. Cl.
G06T 17/00    (2006.01)
G06T 9/00     (2006.01)
G06T 19/20    (2011.01)

(52) U.S. Cl.
CPC ........... *G06T 17/00* (2013.01); *G06T 9/00* (2013.01); *G06T 19/20* (2013.01); *G06T 2219/2012* (2013.01)

(58) Field of Classification Search
None
See application file for complete search history.

(56) References Cited

U.S. PATENT DOCUMENTS

2025/0078392 A1* 3/2025 Shi .................. G06T 15/205

OTHER PUBLICATIONS

Minghua Liu, Ruoxi Shi, Linghao Chen, Zhuoyang Zhang, Chao Xu, Xinyue Wei, Hansheng Chen, Chong Zeng, Jiayuan Gu, Hao Su, "One-2-3-45++: Fast Single Image to 3D Objects with Consistent Multi-View Generation and 3D Diffusion", Nov. 14, 2023, arXiv.org, arXiv:2311.07885.*

Ajay Jain, Ben Mildenhall, Jonathan T. Barron, Pieter Abbeel, Ben Poole, "Zero-Shot Text-Guided Object Generation with Dream Fields", May 4, 2022, arXiv.org, arXiv:2112.01455.*

Minghua Liu, Chao Xu, Haian Jin, Linghao Chen, Mukund Varma T, Zexiang Xu, Hao Su, "One-2-3-45: Any Single Image to 3D Mesh in 45 Seconds without Per-Shape Optimization", Jun. 29, 2023, arXiv.org, arXiv: 2306.16928.*

(Continued)

*Primary Examiner* — Robert Bader
(74) *Attorney, Agent, or Firm* — BakerHostetler

(57) ABSTRACT

The present disclosure describes techniques for generating three-dimensional models using machine learning models. A two-dimensional (2D) image is input into a machine learning model. The machine learning model is configured to generate three-dimensional (3D) models with accurate geometry and detailed textures. A set of multi-view images is generated based at least in part on the 2D image by a first sub-model of the machine learning model. The first sub-model comprises a multi-level image prompt controller configured to implement hierarchical controls over generating multi-view images by the first sub-model based at least in part on an input image. A 3D model is generated based at least in part on the set of multi-view images by a second sub-model of the machine learning model. The second sub-model is configured to implement a background alignment and a camera alignment for improving quality and geometric accuracy of the generated 3D models.

18 Claims, 19 Drawing Sheets

(56) References Cited

OTHER PUBLICATIONS

Wang et al.; "ImageDream: Image-Prompt Multi-view Diffusion for 3D Generation"; https:/image-dream.github.io/; accessed Jan. 25, 2024; 2 pages.
"SD-XL 1.0-base Model Card"; https://huggingface.co/stabilityai/stable-diffusion-xl-base-1.0; Hugging Face; accessed May 9, 2024; 10 pages.
"Stable Diffusion Image Variations; https://huggingface.co/spaces/lambdalabs/stable-diffusion-image-variations"; Hugging Face; accessed May 9, 2024; 3 pages.
Chan et al.; "Efficient Geometry-Aware 3D Generative Adversarial Networks"; IEEE/CVF Conf. on Computer Vision and Pattern Recognition; 2022; p. 16123-16133.
Chan et al.; "Generative Novel View Synthesis with 3D-Aware Diffusion Models"; arXiv:2304.02602; Apr. 2023; 20 pages.
Chang et al.; "ShapeNet: An Information-Rich 3D Model Repository"; Computer Vision and Pattern Recognition; arXiv:1512.03012; Dec. 2015; 11 pages.
Chen et al.; "Fantasia3D: Disentangling Geometry and Appearance for High-quality Text-to-3D Content Creation"; IEEE/CVF Int'l Conf. on Computer Vision; 2023; p. 22246-22256.
Dietke et al.; "Objaverse-XL: A Universe of 10M+ 3D Objects"; $37^{th}$ Conf. on Neural Information Processing Systems; 2023; 15 pages.
Deitke et al.; "Objaverse: A Universe of Annotated 3D Objects"; IEEE/CVF Conf. on Computer Vision and Pattern Recognition; 2023; p. 13142-13153.
Deng et al.; "GRAM: Generative Radiance Manifolds for 3D-Aware Image Generation"; IEEE/CVF Conf. on Computer Vision and Pattern Recognition; 2022; p. 10673-10683.
Gao et al.; "GET3D: A Generative Model of High Quality 3D Textured Shapes Learned from Images"; $36^{th}$ Conf. on Neural Information Processing Systems; 2022; 14 pages.
Henderson et al.; "Learning Single-Image 3D Reconstruction by Generative Modelling of Shape, Pose and Shading"; Int'l Journal of Computer Vision; vol. 128; 2020; p. 835-854.
Henderson et al.; "Leveraging 2D Data to Learn Textured 3D Mesh Generation"; IEEE/CVF Conf. on Computer Vision and Pattern Recognition; 2020; p. 7498-7507.
Huang et al.; "DreamTime: An Improved Optimization Strategy for Diffusion-Guided 3D Generation"; ICLR; 2024; 21 pages.
Jun et al.; "Shap-E: Generating Conditional 3D Implicit Functions"; Computer Vision and Pattern Recognition; arXiv:2305.02463; May 2023; 23 pages.
Karnewar et al.; "Holodiffusion: Training a 3D Diffusion Model Using 2D Images"; IEEE/CVF Conf. on Computer Vision and Pattern Recognition; 2023; p. 18423-18433.
Lin et al.; "Magic3D: High-Resolution Text-to-3D Content Creation"; IEEE/CVF Conf. on Computer Vision and Pattern Recognition; 2023; p. 300-309.
Lin et al.; "Common Diffusion Noise Schedules and Sample Steps Are Flawed"; IEEE/CVF Winter Conf. on Applications of Computer Vision; 2024; p. 5404-5411.
Liu et al.; "Zero-1-to-3: Zero-shot One Image to 3D Object"; IEEE/CVF Int'l Conf. on Computer Vision; 2023; p. 9298-9309.
Liu et al.; "SyncDreamer: Generating Multiview-consistent Images from a Single-view Image"; ICLR; 2024; 22 pages.
Long et al.; "Wonder3D: Single Image to 3D using Cross-Domain Diffusion"; Computer Vision and Pattern Recognition; arXiv:2310.15008; Nov. 2023; 13 pages.
Melas-Kyriazi et al.; "RealFusion: 360deg Reconstruction of Any Object From a Single Image"; IEEE/CVF Conf. on Computer Vision and Pattern Recognition; 2023; p. 8446-8455.
Mildenhall et al.; "NeRF: representing scenes as neural radiance fields for view synthesis"; Communications of the ACM; vol. 65; Jan. 2022; p. 99-105.
Nguyen-Phouc et al.; "HoloGAN: Unsupervised Learning of 3D Representations From Natural Images"; IEEE/CVF Int'l Conf. on Computer Vision; 2019; p. 7588-7597.
Nguyen-Phouc et al.; "BlockGAN: Learning 3D Object-aware Scene Representations from Unlabelled Images"; $34^{th}$ Conf. on Neural Information Processing Systems; 2020; 12 pages.
Nichol et al.; "Point-E: A System for Generating 3D Point Clouds from Complex Prompts"; Computer Vision and Pattern Recognition; arXiv:2212.08751; Dec. 2022; 14 pages.
Niemeyer et al.; "Giraffe: Representing Scenes As Compositional Generative Neural Feature Fields"; IEEE/CVF Conf. on Computer Vision and Pattern Recognition; 2021; p. 11453-11464.
Niemeyer et al.; "RegNeRF: Regularizing Neural Radiance Fields for View Synthesis From Sparse Inputs"; IEEE/CVF Conf. on Computer Vision and Pattern Recognition; 2022; p. 5480-5490.
Podell et al.; "SDXL: Improving Latent Diffusion Models for High-Resolution Image Synthesis"; Computer Vision and Pattern Recognition; arXiv:2307.01952; Jul. 2023; 21 pages.
Poole et al.; "DreamFusion: Text-to-3D using 2D Diffusion"; Computer Vision and Pattern Recognition; arXiv:2209.14988; Sep. 2022; 18 pages.
Qian et al. "Magic123: One Image to High-Quality 3D Object Generation Using Both 2D and 3D Diffusion Priors"; Computer Vision and Pattern Recognition; arXiv:2306.17843; Jul. 2023; 18 pages.
Radford et al.; "Learning Transferable Visual Models From Natural Language Supervision"; $38^{th}$ Int'l Conf. on Machine Learning; arXiv:2103.00020; Feb. 2021; 48 pages.
Rombach et al.; "High-Resolution Image Synthesis With Latent Diffusion Models"; IEEE/CVF Conf. on Computer Vision and Pattern Recognition; 2022; p. 10684-10695.
Salimans et al.; "Improved Techniques for Training GANs"; Computer Vision and Pattern Recognition; arXiv:1606.03498; Jun. 2016; 10 pages.
Schuhmann et al.; "LAION-5B: An open large-scale dataset for training next generation image-text models"; $36^{th}$ Conf. Neural Information Processing Systems; 2022; 17 pages.
Shi et al.; "Zero123++: a Single Image to Consistent Multi-view Diffusion Base Model"; Computer Vision and Pattern Recognition; arXiv:2310.15110; Oct. 2023; 9 pages.
Shi et al.; "MVDream: Multi-view Diffusion for 3D Generation"; Computer Vision and Pattern Recognition; arXiv:2308.16512; Apr. 2024; 21 pages.
Shue et al.; "3D Neural Field Generation Using Triplane Diffusion"; IEEE/CVF Conf. on Computer Vision and Pattern Recognition; 2023; p. 20875-20886.
Sitzman et al.; "Scene Representation Networks: Continuous 3D-Structure-Aware Neural Scene Representations"; $33^{rd}$ Conf. on Neural Information Processing Systems; 2019; 12 pages.
Sun et al.; "DreamCraft3D: Hierarchical 3D Generation with Bootstrapped Diffusion Prior"; Computer Vision and Pattern Recognition; arXiv:2310.16818; Oct. 2023; 20 pages.
Szymanowicz et al.; "Viewset Diffusion: (0-)Image-Conditioned 3D Generative Models from 2D Data"; IEEE/CVF Int'l Conf. on Computer Vision; 2023; p. 8863-8873.
Tang et al.; "Make-It-3D: High-fidelity 3D Creation from A Single Image with Diffusion Prior"; IEEE/CVF Int'l Conf. on Computer Vision; 2023; p. 22819-22829.
Tsalicoglou et al.; "TextMesh: Generation of Realistic 3D Meshes From Text Prompts"; Computer Vision and Pattern Recognition; arXiv:2304.12439; Apr. 2023; 10 pages.
Wang et al.; "Score Jacobian Chaining: Lifting Pretrained 2D Diffusion Models for 3D Generation"; IEEE/CVF Conf. on Computer Vision and Pattern Recognition; 2023; p. 12619-12629.
Wang et al.; "RODIN: A Generative Model for Sculpting 3D Digital Avatars Using Diffusion"; IEEE/CVF Conf. on Computer Vision and Pattern Recognition; 2023; p. 4563-4573.
Wang et al.; "ProlificDreamer: High-Fidelity and Diverse Text-to-3D Generation with Variational Score Distillation"; $37^{th}$ Conf. on Neural Information Processing Systems; 2023; 36 pages.
Watson et al.; "Novel View Synthesis with Diffusion Models"; Computer Vision and Pattern Recognition; arXiv:2210.04628; Oct. 2022; 21 pages.
Wu et al.; "Multiview Compressive Coding for 3D Reconstruction"; IEEE/CVF Conf. on Computer Vison and Pattern Recognition; 2023; p. 9065-9075.

(56) References Cited

OTHER PUBLICATIONS

Xu et al.; "SinNeRF: Training Neural Radiance Fields on Complex Scenes from a Single Image"; ECCV Computer Vision; arXiv:2204.00928; Aug. 2022; 18 pages.

Xu et al.; "NeuralLift-360: Lifting an In-the-Wild 2D Photo to a 3D Object With 360 degrees Views"; IEEE/CVF Conf. on Computer Vision and Pattern Recognition; 2023; p. 4479-4489.

Ye et al.; "IP-Adapter: Text Compatible Image Prompt Adapter for Text-to-Image Diffusion Models"; Computer Vision and Pattern Recognition; arXiv:2308.06721; Aug. 2023; 16 pages.

Ye et al.; "Consistent-1-to-3: Consistent Image to 3D View Synthesis via Geometry-aware Diffusion Models"; Computer Vision and Pattern Recognition; arXiv:2310.03020; Mar. 2024; 13 pages.

Zhou et al.; "SparseFusion: Distilling View-Conditioned Diffusion for 3D Reconstruction"; IEEE/CVF Conf. on Computer Vision and Pattern Recognition; 2023; p. 12588-12597.

\* cited by examiner

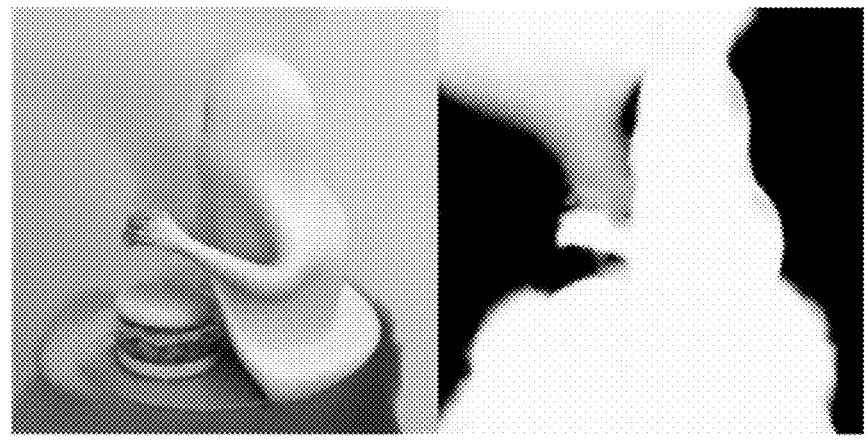
FIG. 8A
 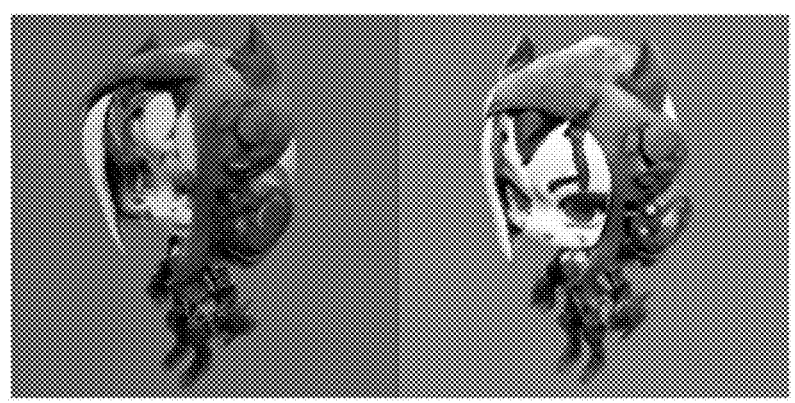
FIG. 8B

900

Input a two-dimensional (2D) image into a machine learning model, wherein the machine learning model is configured to generate three-dimensional (3D) models with accurate geometry and detailed textures 902

Generate a set of multi-view images based at least in part on the 2D image by a first sub-model of the machine learning model, wherein the first sub-model comprises a multi-level image prompt controller configured to implement hierarchical controls over generating multi-view images by the first sub-model based on an input image 904

Generate a 3D model based at least in part on the set of multi-view images by a second sub-model of the machine learning model, wherein the second sub-model is configured to implement a background alignment and a camera alignment for improving quality and geometric accuracy of the generated 3D models 906

```
┌─────────────────────────────────────────────────────────────────────┐
│ Perform encoding on a 2D image by a contrastive language-image pre-training encoder │
│                              (CLIP) 1002                            │
└─────────────────────────────────────────────────────────────────────┘
```

```
┌─────────────────────────────────────────────────────────────────────┐
│ Generate a vector by a global controller of a multi-level image prompt controller based │
│   on the encoded image features, wherein the global controller is configured to enable a │
│    first sub-model to absorb global structural information from the 2D image 1004 │
└─────────────────────────────────────────────────────────────────────┘
```

```
┌─────────────────────────────────────────────────────────────────────┐
│   Implement a first control of generating a set of multi-view images by inputting the │
│ vector from the global controller into cross-attention layers of the first sub-model 1006 │
└─────────────────────────────────────────────────────────────────────┘
```

```
┌─────────────────────────────────────────────────────────────────────┐
│       Adapting the vector from the global controller by a multi-layer perceptron 1008 │
└─────────────────────────────────────────────────────────────────────┘
```

```
┌─────────────────────────────────────────────────────────────────────┐
│              Input the adapted vector into the cross-attention layers 1010 │
└─────────────────────────────────────────────────────────────────────┘
```

Perform encoding on a 2D image by a contrastive language-image pre-training encoder (CLIP) 1102

Resample hidden features from the CLIP encoder before global pooling by a resampling component of a local controller of a multi-level image prompt controller and generating balanced local features, wherein the local controller is configured to enable a first sub-model to capture detailed structural information from the 2D image 1104

Implement a second control of generating the set of multi-view images by inputting the balanced local features into cross-attention layers of the first sub-model 1106

Adapting the balanced local features from the local controller 1108

Input the adapted balanced local features into the cross-attention layers 1110

Input a two-dimensional (2D) image into a machine learning model, wherein the machine learning model is configured to generate three-dimensional (3D) models with accurate geometry and detailed textures, wherein the 2D image comprises a 2D object 1302

Generate a set of multi-view images based at least in part on the 2D image by a first sub-model of the machine learning model, wherein the set of multi-view images comprises a plurality of images of the 2D object from different perspective views 1304

Generate a 3D model based at least in part on the set of multi-view images by a second sub-model of the machine learning model, wherein the 3D model comprises a 3D object corresponding to the 2D object 1306

Adjusting a background of the 2D image to match a randomly colored background for differentiating an interior and an exterior of the 3D object during optimizing the 3D model to eliminate floating artifacts from the generated 3D model 1308

Input a two-dimensional (2D) image into a machine learning model, wherein the machine learning model is configured to generate three-dimensional (3D) models with accurate geometry and detailed textures, wherein the 2D image comprises a 2D object 1402

Generate a set of multi-view images based at least in part on the 2D image by a first sub-model of the machine learning model, wherein the set of multi-view images comprises a plurality of images of the 2D object from different perspective views 1404

Generate a 3D model based at least in part on the set of multi-view images by a second sub-model of the machine learning model, wherein the 3D model comprises a 3D object corresponding to the 2D object 1406

Improve geometric accuracy of the 3D object by narrowing parameter sampling ranges for camera parameters during a process of generating the 3D model 1408

Generate a 3D model based on a 2D image and a set of multi-view images by a machine learning model, wherein the 2D image comprises a 2D object, wherein the set of multi-view images comprises a plurality of images of the 2D object from different perspective views, and wherein the 3D model comprises a 3D object corresponding to the 2D object 1502

Improve the geometric accuracy of the 3D object by applying a canonical camera coordination across different object instances 1504

| Model | Synthesized Image | | | Re-rendered | | |
|---|---|---|---|---|---|---|
| | QIS(256)↑ | CLIP(TX)↑ | CLIP(IM)↑ | QIS(320)↑ | CLIP(TX)↑ | CLIP(IM)↑ |
| SD-XL [1] | 52.0 ± 30.5 | 34.6 ± 3.09 | 100 | | | |
| MVDream [36] | 23.05 ± 14.4 | 31.64 ± 2.99 | 78.41 ± 5.32 | 29.02 ± 10.24 | 32.69 ± 3.39 | 79.63 ± 4.15 |
| Zero123 [18] | 22.16 ± 11.16 | 30.42 ± 3.19 | 84.88 ± 5.12 | 28.66 ± 5.03 | 29.19 ± 3.60 | 79.92 ± 6.59 |
| Zero123-xl [18] | 34.07 ± 11.64 | 30.80 ± 2.59 | 84.10 ± 4.76 | 24.23 ± 7.68 | 29.56 ± 4.73 | 82.50 ± 8.78 |
| Magic123 [30] | - | - | - | 19.84 ± 6.64 | 25.82 ± 3.39 | 73.20 ± 6.30 |
| SyncDreamer [19] | 22.04 ± 11.9 | 27.96 ± 3.01 | 78.17 ± 6.13 | | | |
| ImageDream | | | | | | |
| - global | 22.31 ± 7.59 | 32.01 ± 2.84 | 84.50 ± 3.96 | 22.51 ± 5.86 | 31.48 ± 3.32 | 82.58 ± 4.35 |
| - local | 22.49 ± 9.57 | 31.32 ± 2.86 | 82.99 ± 6.03 | 22.30 ± 4.47 | 31.71 ± 2.96 | 84.34 ± 3.13 |
| - +pixel | 27.10 ± 12.8 | 32.39 ± 2.78 | 85.69 ± 3.77 | 25.16 ± 6.49 | 31.59 ± 3.23 | 84.83 ± 4.08 |

FIG. 18

GENERATING THREE-DIMENSIONAL MODELS USING MACHINE LEARNING MODELS

BACKGROUND

Machine learning models are increasingly being used across a variety of industries to perform a variety of different tasks. Such tasks may include content generation. Improved techniques for utilizing machine learning models for content generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIGS. 8A-B show background alignment and camera alignment in accordance with the present disclosure.

FIG. 9 shows an example process for generating 3D models using machine learning models in accordance with the present disclosure.

FIG. 10 shows an example process for generating 3D models using machine learning models in accordance with the present disclosure.

FIG. 11 shows an example process for generating 3D models using machine learning models in accordance with the present disclosure.

FIG. 13 shows an example process for generating 3D models using machine learning models in accordance with the present disclosure.

FIG. 14 shows an example process for generating 3D models using machine learning models in accordance with the present disclosure.

FIG. 15 shows an example process for generating 3D models using machine learning models in accordance with the present disclosure.

FIG. 18 shows example evaluation results for a machine learning model configured to generate 3D models in accordance with the present disclosure.

DETAILED DESCRIPTION OF ILLUSTRATIVE EMBODIMENTS

Figure 1:
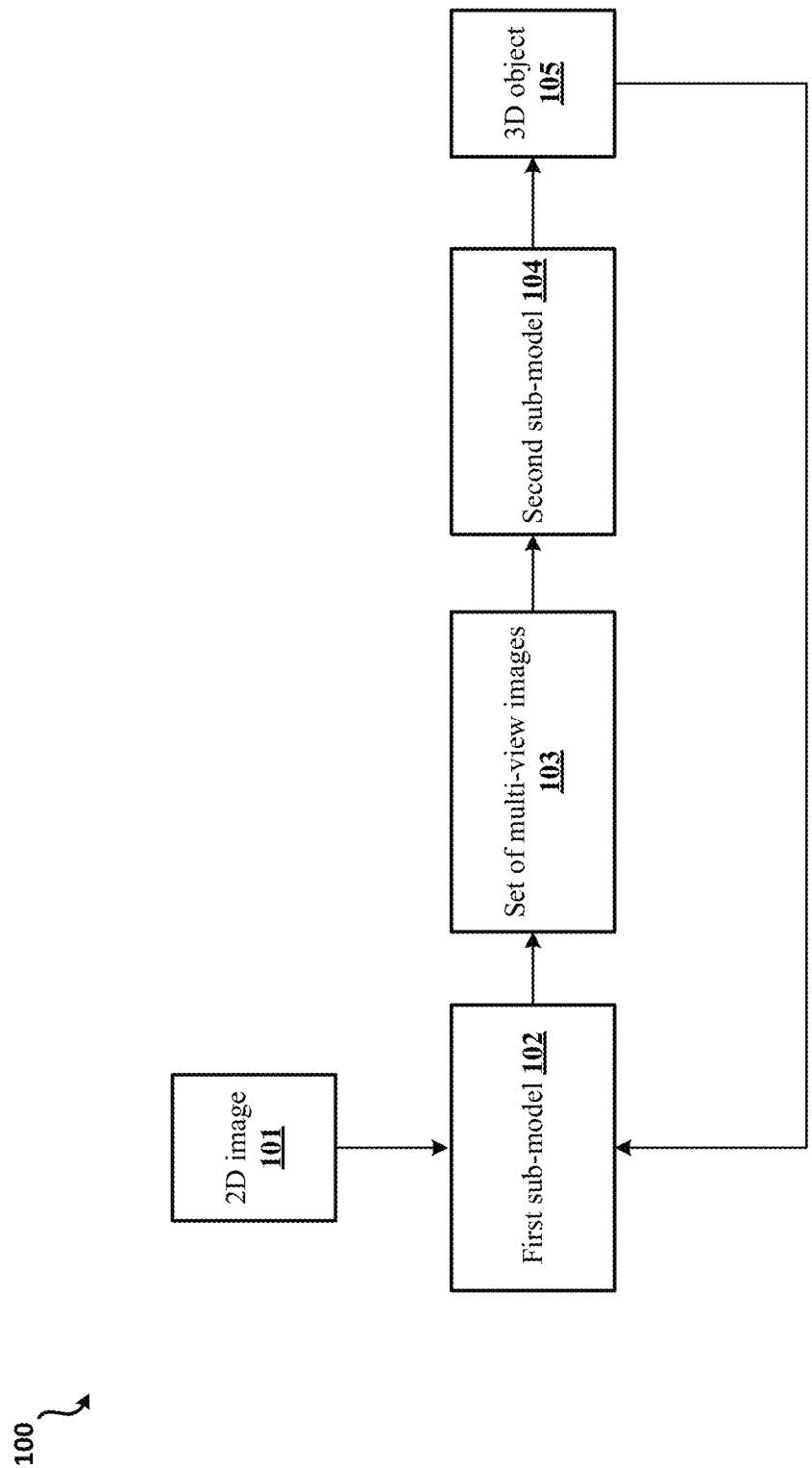
FIG. 1 shows an example system for generating three-dimensional (3D) models using machine learning models in accordance with the present disclosure.

Machine learning models may be used to generate three-dimensional (3D) assets (e.g., animations, content, models, etc.). Such machine learning models may generate the 3D assets based on text prompts, such as text prompts received from users. The users may input text associated with a desired 3D asset, and the machine learning model may generate a 3D asset corresponding to the input text. The generated 3D assets can be used as materials for education, games, or toys. The generated 3D assets can be used for secondary processing, editing, action skeleton intervention, animation, and more.

Incorporating images as an additional modality (e.g., in addition to text) for 3D generation offers significant advantages. Images convey rich, precise visual information that text might ambiguously describe or entirely omit. For instance, subtle details like textures, colors, and spatial relationships can be directly and unambiguously captured in an image, whereas a text description might struggle to convey the same level of detail comprehensively or might require excessively lengthy descriptions. This visual specificity aids in generating more accurate and detailed 3D models, as the system can directly reference actual visual cues rather than interpret textual descriptions, which can vary greatly in detail and subjectivity. Further, using images allows for a more intuitive and direct way for users to communicate their desired outcomes, particularly for those who may find it challenging to articulate their visions textually. This multimodal approach, combining the richness of visual data with the contextual depth of text, leads to a more robust, user-friendly, and efficient 3D generation process, catering to a wider range of creative and practical applications.

Adopting images as an additional modality for 3D object generation comes with several challenges. Unlike text, images contain a multitude of features like color, texture, spatial relationships that are more complex to analyze and interpret. In addition, high variations of light, shape or self-occlusion within the object can lead to inaccurate and inconsistent view synthesis, therefore leading blurry or incomplete 3D models. Reconstructed objects often lack geometric accuracy and detailed textures. Non-matching pixels are averaged in the final 3D object during reconstruction, leading to indistinct textures and smoothed geometry. Thus, improved techniques for 3D model generation are needed.

Described herein in an improved system (i.e., Image-Dream) for 3D model generation. The improved system involves canonical camera coordination across different object instances and comprises a multi-level image-prompt controller including a global controller, a local controller, and a pixel controller. Applying a canonical camera coordination across different object instances improves geometric accuracy of generated 3D objects. The multi-level controller offers hierarchical controls, guiding the diffusion model from the image input to each architectural block, thereby streamlining the path of information transfer.

FIG. 1 illustrates an example machine learning model 100 for generating 3D models (e.g., 3D objects) using machine learning models. The machine learning model 100 may be configured to generate three-dimensional (3D) models with accurate geometry and detailed textures. The machine learning model 100 may comprise a first sub-model 102 and a second sub-model 104.

The first sub-model 102 may be configured to generate a set of multi-view images 103 based at least in part on an input two-dimensional (2D) image 101. The first sub-model 102 may be configured to generate a set of multi-view images 103 based on the input 2D image 101 and input text. The input 2D image 101 may be input by (e.g., received from) a user. The input 2D image 101 may be indicative of an object for which the user wants to generate a 3D model. The input 2D image 101 may comprise a 2D object. The set of multi-view images 103 may comprise a set of four images of the same object from four different orthogonal perspective views. For example, the set of multi-view images may comprise a set of four images of a same object from a front (e.g., 0 degree) view, a first side (e.g., 90 degree) view, a back (e.g., 180 degree) view, and a second side (e.g., 270 degree) view. The object may be associated with the input 2D image 101 and input text. For example, the set of multi-view images 103 may comprise a plurality of images of the 2D object depicted in the input image from different perspective views.

In embodiments, the first sub-model 102 comprises a multi-level image prompt controller. The multi-level image prompt controller may be configured to implement hierarchical controls over generating the set of multi-view images based at least in part on an input 2D image. The multi-level image prompt controller is discussed in more detail below with regard to FIGS. 3-6. The second sub-model 104 may receive the set of multi-view images 103 as input. The second sub-model 104 may generate a 3D model (e.g., 3D object 105) based at least in part on the set of multi-view images 103. The second sub-model 104 may be configured to implement a background alignment and a camera alignment for improving quality and geometric accuracy of the generated 3D models (e.g., 3D objects 105). The background alignment and a camera alignment are discussed in more detail below with regard to FIGS. 8A-B. The 3D object 105 may depict the object associated with the input 2D image 101. The 3D object 105 may be used for secondary processing, editing, action skeleton intervention, animation, and more.

Figure 2:
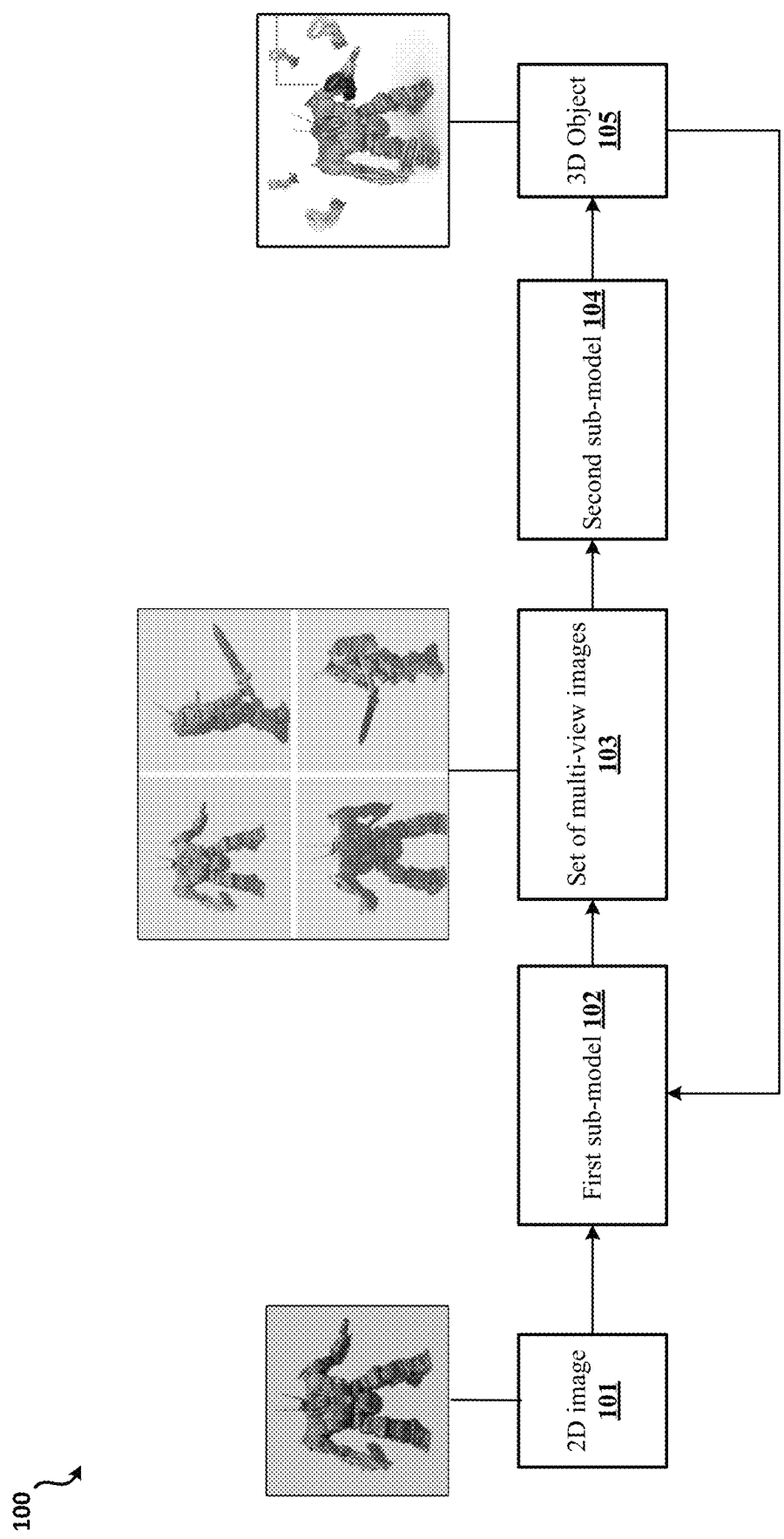
FIG. 2 shows an example system for generating 3D models using machine learning models in accordance with the present disclosure.

FIG. 2 illustrates the machine learning model 100. As described above, the first sub-model 102 may be configured to generate a set of multi-view images 103 based at least on an input 2D image 101. In the example of FIG. 2, the input 2D image 101 depicts a robot. The first sub-model 102 may be configured to generate a set of multi-view images 103 based on the 2D image of the robot. The input 2D image 101 may be input by (e.g., received from) a user. The user may want to generate a 3D model (e.g., asset, object) of a robot. The set of multi-view images 103 may comprise a set of four images of the robot from four different orthogonal perspective views. For example, the set of multi-view images may comprise a set of four images of the same robot from a front (e.g., 0 degree) view, a first side (e.g., 90 degree) view, a back (e.g., 180 degree) view, and a second side (e.g., 270 degree) view. The second sub-model 104 may receive the set of multi-view images 103 as input. The second sub-model 104 may generate a 3D model (e.g., 3D object 105) of a robot based at least in part on the set of multi-view images 103.

Figure 3:
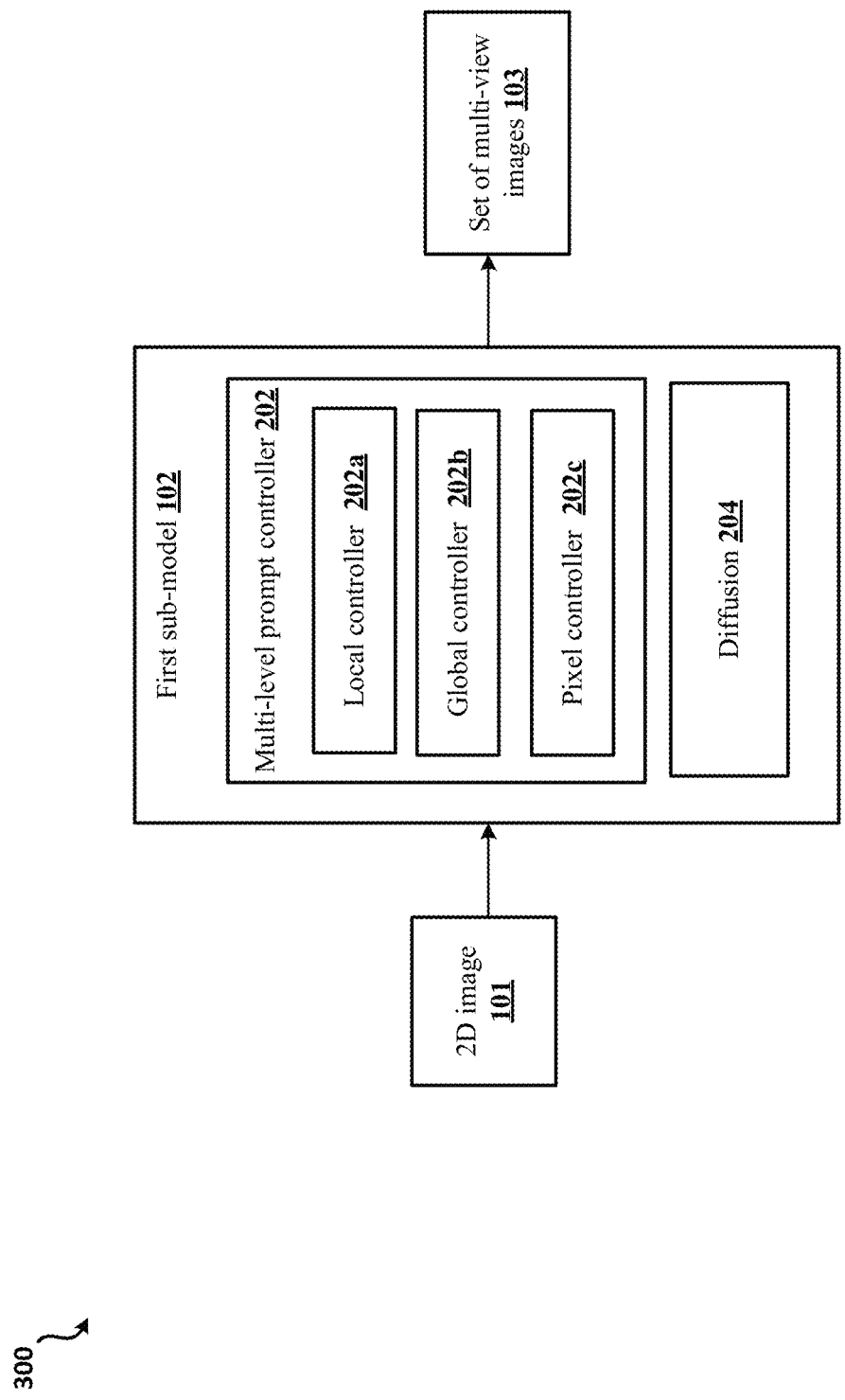
FIG. 3 shows an example first sub-model in accordance with the present disclosure.

FIG. 3 illustrates a diagram 300 showing the first sub-model 102 in more detail. The first sub-model 102 comprises a multi-level image prompt controller 202 and a diffusion model 204. The multi-level image prompt controller 202 may be configured to implement hierarchical controls over generating the set of multi-view images based at least in part on an input 2D image. The multi-level image prompt controller 202 may comprise, for example, a local controller 202a, a global controller 202b, and a pixel controller 202c.

The local controller 202a may be configured to enable the first sub-model 102 to capture detailed structural information from the input image 101. The input image 101 may be encoded by a contrastive language-image pre-training encoder (CLIP). Hidden features from the CLIP encoder may be resampled. The hidden features may be resampled before global pooling. The resampling may be performed by a resampling component of the local controller 202a. The local controller 202a may generate balanced local features. A control of the local controller 202a may be implemented by inputting the balanced local features into cross-attention layers of the diffusion block 204.

The global controller 202b may be configured to enable the first sub-model 102 to absorb global structural information from the input image 101. The input image 101 may be encoded (e.g., CLIP encoded). The global controller 202b may generate a vector based on the encoded image features. A control of the global controller may be implemented by inputting the vector from the global controller 202b into the cross-attention layers of the diffusion block 204. The vector may be adapted by a multi-layer perceptron. The adapted vector may be input into the cross-attention layers of the diffusion block 204.

The pixel controller 202c may be configured to enable the first sub-model 102 to optimize textures of a generated 3D model (e.g., 3D object) based on an appearance of the input image 101. The input image 101 may be encoded (e.g., variational auto-encoded (VAE)). The VAE encoded image features may be embedded across all attention layers. The pixel controller 202c may be incorporated into the first sub-model 102 to enable 3D self-attention processes between the input image 101 and the set of multi-view images 103.

Figure 4:
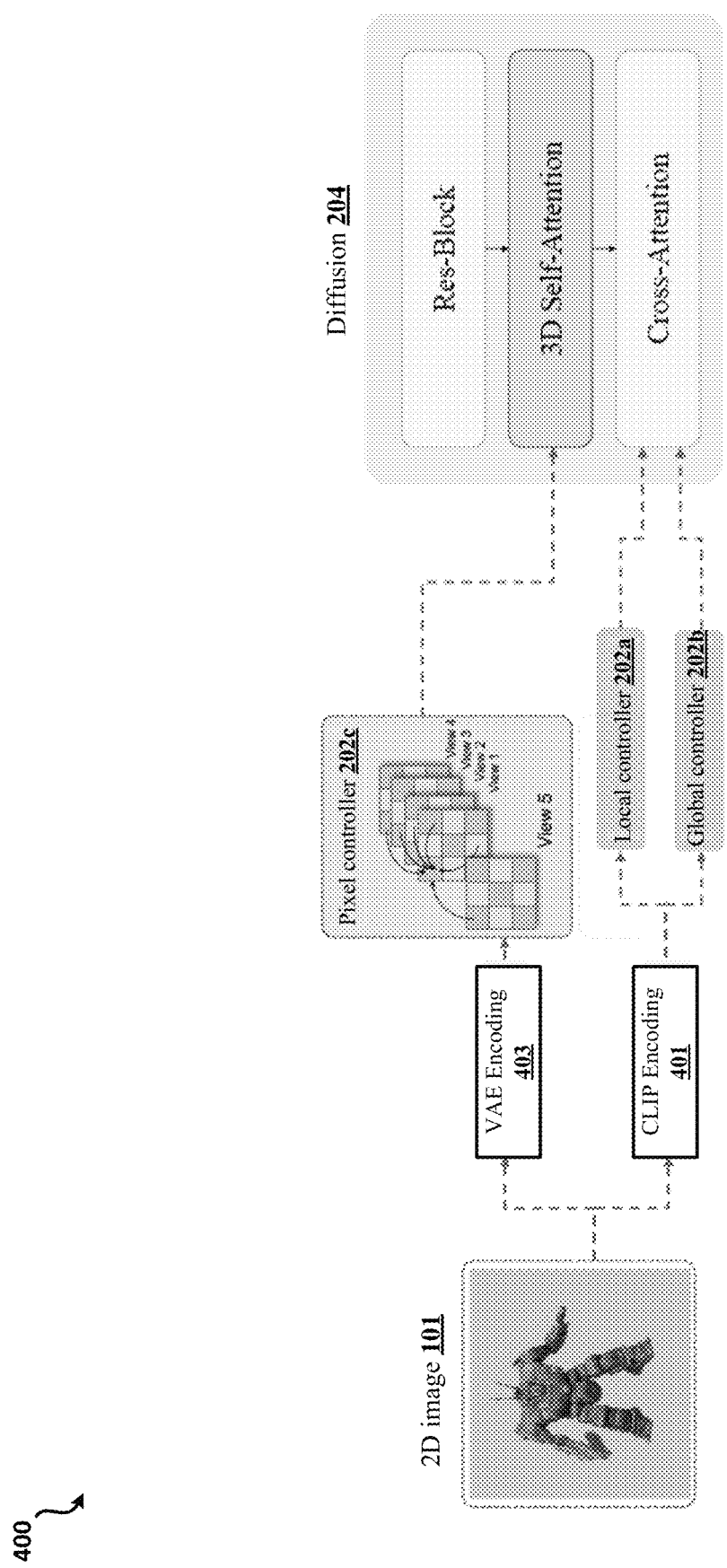
FIG. 4 shows an example first sub-model in accordance with the present disclosure.

FIG. 4 illustrates a diagram 400 showing the first sub-model 102 in more detail. The first sub-model 102 comprises the multi-level image prompt controller 202 and the diffusion block 204. The multi-level image prompt controller 202 may be configured to implement hierarchical controls over generating the set of multi-view images based at least in part on an input 2D image. The multi-level image prompt controller 202 may comprise the local controller 202a, the global controller 202b, and the pixel controller 202c.

The input 2D image 101 may be encoded (e.g., CLIP encoded) by a CLIP encoder 401. The local controller 202a and the global controller 202b take input of image features after CLIP encoding. The local controller 202a and the global controller 202b may output adapted features to cross-attention layers of the diffusion block 204. The adapted features may represent image semantic information. The input image 101 may be encoded (e.g., VAE encoded) by a VAE encoder 403. The pixel controller 202c may send the VAE encoded feature to a 3D self-attention layer of the diffusion block 204. The 3D self-attention layer of the diffusion block 204 may perform pixel-level dense self-attention with corresponding hidden features at each layer of the four-view diffusion.

Figure 5:
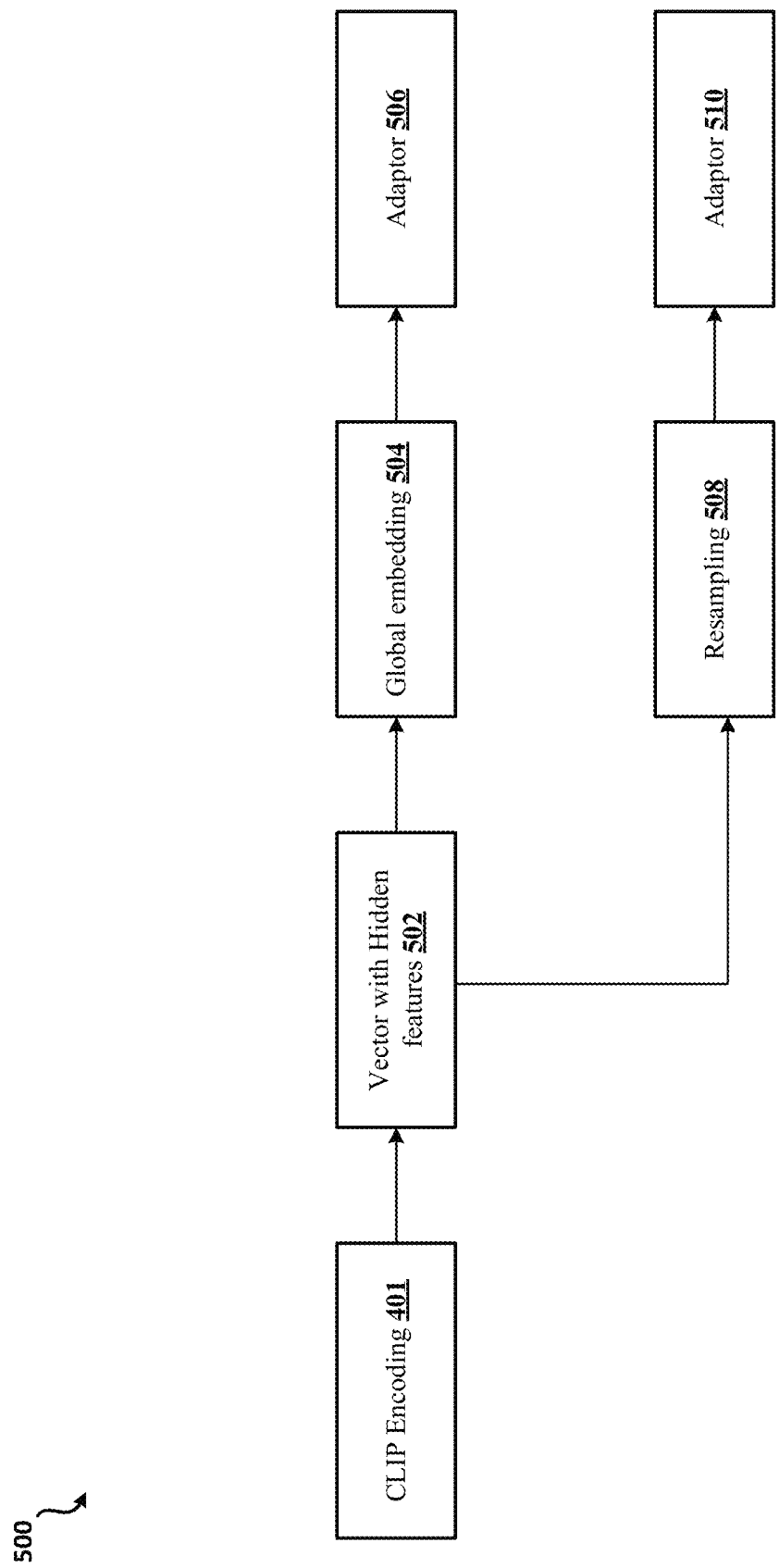
FIG. 5 shows example global controller and local controller in accordance with the present disclosure.

FIG. 5 illustrates a diagram 500 showing the global controller and the local controller in more detail. An input image (e.g., 2D image 101) may be encoded by CLIP encoder 401. The global controller 202b may integrate global embedding 504 into the first sub-model 102. The global embedding 504 may comprise a 1024-dimension vector with a token length of 4 (denoted as $f_g$). A multi-layer perceptron (MLP) θg, functioning as an adaptor 506, may further adapt the vector to be 1024 as the input to cross-attention layers of the diffusion block 204. The adaptor 506 may align image features with text features. The adaptor 506 may be an effective and lightweight adapter that achieves image-prompt capability for pretrained text-to-image diffusion models. The adaptor 506 may be decoupled cross-attention mechanism that separates cross-attention layers for text features and image features.

The hidden features 502 from the CLIP encoder may be resampled by a resampling component 508 of the local controller 202a. The hidden features may be resampled before global pooling. The local controller 202a may generate balanced local features. The balanced local features from the local controller 202a may be adapted by an adaptor 510. The adaptor 510 may be a multi-layer perceptron. The adaptor 510 may be the same as or different from the adaptor 506. The adapted balanced local features may be input into the cross-attention layers of the diffusion block 204. The adapted balanced local features from the local controller enable the first sub-model 102 to capture detailed structural information from the input image.

Figure 6:
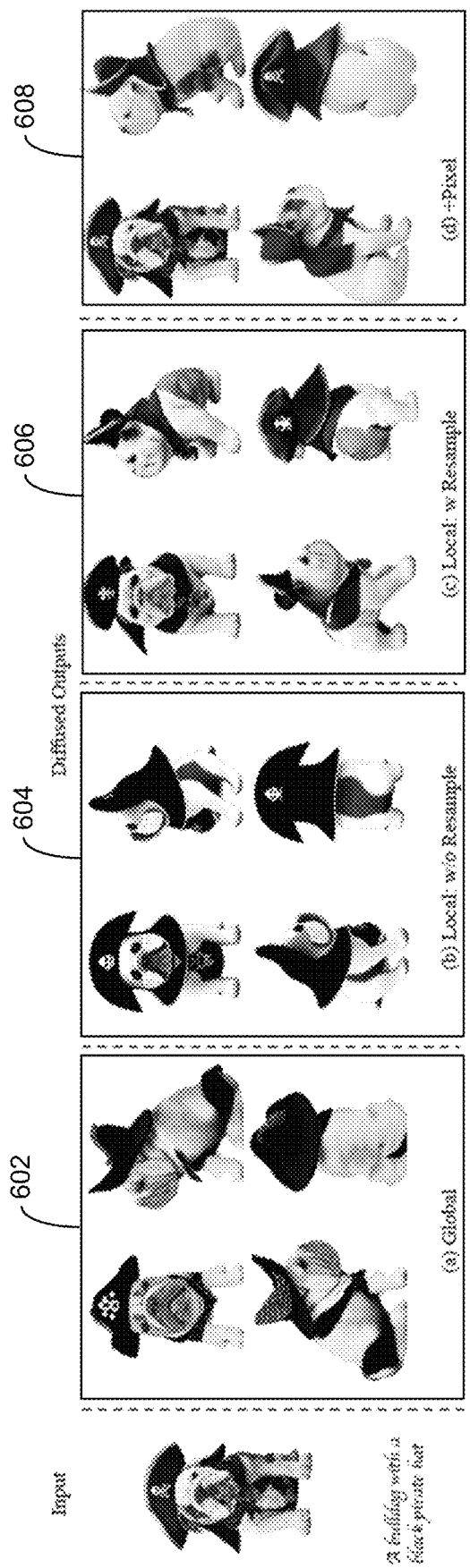
FIG. 6 shows example diffused results from different settings of a multi-level controller in accordance with the present disclosure.

FIG. 6 shows an example of the diffused results from different settings of the multi-level controller in the machine learning model 100. As described above, a multi-layer perceptron (MLP) ($θ_g$), functioning as an adaptor, may be inserted following the CLIP image global embedding. This may align image features with text features. Specifically, CLIP image encoding may encode image features to a 1024-dimension vector with a token length of 4 ($f_g$). The MLP may further adapt the image features as the input to the cross-attention in the diffusion block 204. In the diffusion block 204, inside of an attention layer l, a new set of MLPs, $θ_{kg,l}$ and $θ_{vg,l}$, receive, as input, the adapted features and output its attention key and value matrix. The attention key and value matrix are then aggregated based on the query feature matrix, $q_l$, yielding a corresponding image cross attention feature $h_{g,l}$. Here, a weight λ=1.0 may be introduced to balance the hidden from text and image, and the final output of layer 1 is $h_l = h_{t,l} + λh_{g,l}$.

To train such a model, the diffusion model may be frozen, and only $\{θ_g, θ_{kg,l}, θ_{vg,l}\}_l$ were fine-tuned. After the model is tuned, the model is able to absorb some information from the input image, such as a structure of the object. As illustrated in the example 602 of FIG. 6, when compared with the input 2D image, the diffused output is able to put the pirate hat similar to the image on the bulldog, while some detailed pose and appearance information is lost.

To enhance control, the hidden features from the CLIP encoder may be utilized before global pooling, as the hidden features likely contain more detailed structural information. The hidden features, denoted as $f_h$, has a token length of 257 and a feature dimension of 1280. A MLP adaptor $θ_h$ may be introduced to feed $f_h$ into the diffusion network's cross-attention module, with $θ_{kh,l}$ and $θ_{vh,l}$ forming the key and values matrix. These parameters, $\{θ_{kh,l}, θ_{vh,l}, θ_h\}_l$, may be jointly trained as learnable elements similar to the global controller 202b. Post-training, the results were overly sensitive to image tokens, leading to overexposed and unrealistic images, especially with higher class free guidance (CFG) settings, as shown in the example 604 of FIG. 6. To mitigate this, a resampling module $θ_r$ was used to reduce the hidden token count from 257 to 16, resulting in a more balanced local image feature $f_r$. The corresponding local controller parameters are $\{θ_r, θ_{kr,l}, θ_{vr,l}\}_l$. As the example 606 of FIG. 6 illustrates, after this resampling, the diffused images look more realistic, even at higher CFG levels. From the generated images, it's evident that the model captures the overall layout and object shape, but also struggles with finer identity details like object skin texture.

The pixel controller 202c may be used to optimally integrate object appearance texture. To optimally integrate object appearance texture, the image prompt pixel latent x may be embedded across all attention layers in the machine learning model 100. Specifically, the machine learning model 100 employs a 3D dense self-attention mechanism with a shape of (bz, 4, c, $h_l$, $w_l$) across four views within a transformer layer. The machine learning model 100 further employs an additional frame by concatenating the input image, resulting in a feature shape of (bz, 5, c, $h_l$, $w_l$). This enables similar 3D self-attention processes between the four-view images and the input image.

During the training of the diffusion block 204, noise may not be added to the latent from the input image prompt, ensuring the network clearly captures the image information. Additionally, to differentiate the input image features, an all-zero vector may be assigned to the camera embedding of the input image. Given that the pixel controller 202c is integrated into the multi-view diffusion without extra parameters, all feature parameters may be fine-tuned in unison, adopting the same training regime as the local controller 202a and the global controller 202b but with a learning rate reduced by a factor of ten. This approach may preserve the original feature representations more effectively. Post-training, as depicted in the example 608 of FIG. 6, the generated multi-view images not only maintain the appearance from the input image, but also uphold multi-view consistency, resulting in satisfactory 3D model fusion.

Figure 7:
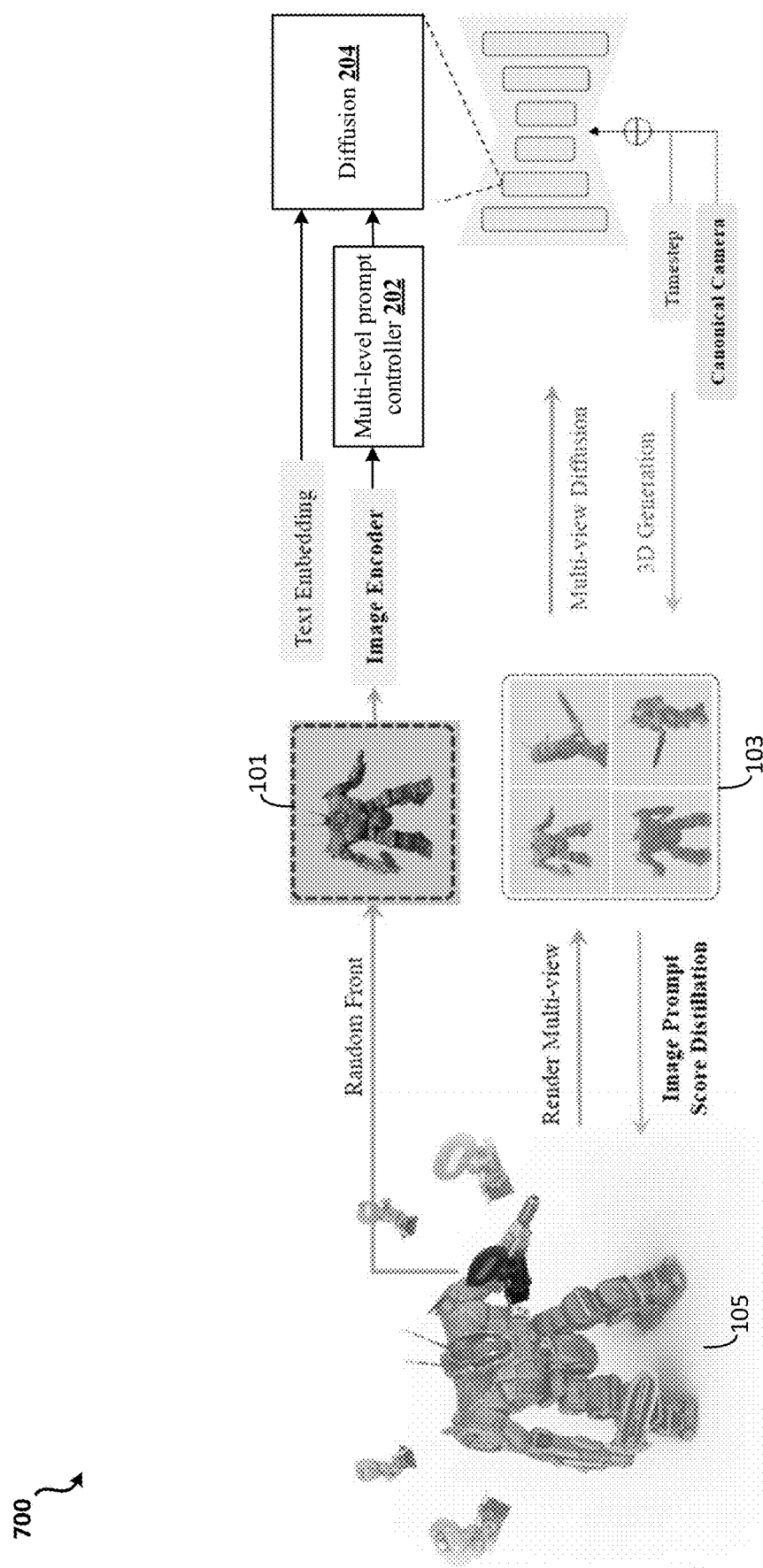
FIG. 7 shows an example system for generating 3D models using machine learning models in accordance with the present disclosure.

FIG. 7 illustrates a system 700 that shows the machine learning model 100 in more detail. The first sub-model 102 may be configured to generate the set of multi-view images 103 based at least on an input 2D image 101. For example, the first sub-model 102 may be configured to generate a set of multi-view images 103 based on the input 2D image 101 and text input. The input 2D image 101 and the text may be input by (e.g., received from) a user. The input 2D image 101 and the text may be indicative of a 3D model that the user wants to generate. The input 2D image 101 may comprise a 2D object. The set of multi-view images 103 may comprise a set of four images of a same object from four different orthogonal perspective views. For example, the set of multi-view images may comprise a set of four images of a same object from a front (e.g., 0 degree) view, a first side (e.g., 90 degree) view, a back (e.g., 180 degree) view, and a second side (e.g., 270 degree) view. The object may be associated with the input 2D image 101 and the text. For example, the set of multi-view images 103 may comprise a plurality of images of the 2D object depicted in the 2D image 101 and/or described by the text from different perspective views.

As described above, the multi-level image prompt controller 202 may be configured to implement hierarchical controls over generating the set of multi-view images 103 based at least in part on an input image. The diffusion block 204 may receive the output of the multi-level image prompt controller 202 and an embedding of the input text. Based on the output of the multi-level image prompt controller 202 and the text embedding, the diffusion block 204 may generate the set of multi-view images 103. The second sub-model 104 may receive the set of multi-view images 103 as input. The second sub-model 104 may generate a 3D model (e.g., 3D object) based at least in part on the set of multi-view images 103.

During training of the first sub-model 102, multiple views may be rendered based on canonical camera coordination, and at least one other image-prompt front-view image may be rendered with a random setting. The multi-view images may be fed as training targets for multi-view diffusion networks, and image-prompt may be encoded with the multi-level controller as input to the diffusion. During training of the second sub-model 104, the trained diffusion is used for image-prompt score distillation.

To train the first sub-model 102, given a text-image dataset X={x, y} and a multi-view dataset $X_{mv}$={$x_{mv}$, y, $c_{mv}$}, where x is a latent image embedding from VAE, y is a text embedding from CLIP, and c is their self-designed camera embedding, the multi-view (MV) diffusion loss may be formulated as, $$L_{mv}(\theta, X, X_{mv}) = E_{y,c,t,\epsilon}\left[\|\epsilon - \epsilon_\theta(x^p; y, c^p, t)\|_2^2\right], \text{ where}$$

$$(x^p, c^p) = \begin{cases} (x, 0) & \text{with probability } p \\ (x_{mv}, c_{mv}) & \text{with probability } 1 - p \end{cases}$$

where, x is the noisy latent image generated from a random noise $\epsilon$ and image latent, the $\epsilon_\theta$ is the multi-view diffusion model parametrized by $\theta$.

After the first sub-model 102 is trained, the first sub-model 102 can be inserted to the pipeline, where a score-distillation sampling (SDS) is performed based on the four generated views. Specifically, in each iteration step, a random 4 orthogonal views are rendered, with four random views, camera extrinsic and intrinsic. Then, the random 4 orthogonal views may be encoded to latents $x^{mv}$ and inserted to the multi-view diffusion network to compute a diffusion loss in the image space which is back propagated to optimize the parameters of the second sub-model 104. Formally, $$L_{mv-SDS}(\phi, x^{mv}) = E_{t,c,\epsilon}\left[\|x^{mv} - \hat{x}_0^{mv}\|_2^2\right]$$

where, $\hat{x}_0^{mv}$ is the denoised MV image at timestep 0 from the diffusion block.

The second sub-model 104 may be configured to implement a background alignment for improving quality of the generated 3D models. During score-distillation sampling (SDS) optimization, the 3D model generated by the second sub-model 104 includes a randomly colored background to differentiate the interior and exterior of the 3D object. This random background, when input into the diffusion network alongside the object, may conflict with the background from the image prompt, leading to floating artifacts in the 3D model generated by the second sub-model 104, as shown in the example 800 of FIG. 8A. To resolve this, the image-prompt background may be adjusted to match the rendered background color from the second sub-model 104, successfully eliminating these artifacts.

The second sub-model 104 may be configured to implement a camera alignment for geometric accuracy of the generated 3D models. The first sub-model 102 may generate multi-view images mirroring the camera parameters (e.g., elevation, field of view (FoV)) of the input image prompt, parameters which remain unknown to the second sub-model 104 during rendering of the 3D model. Randomly sampling parameters for rendering can result in images incongruent with the image prompt's rendering settings, affecting the geometry of detailed image structures. To mitigate this, the parameter sampling range ([15, 60], [0, 30]) for camera FoV and elevation may be narrowed to [45, 50] and [0, 5], respectively, a range more typical for generated photos. This adjustment may significantly improve the geometric accuracy of the 3D objects, as demonstrated in the example 801 of FIG. 8B. In embodiments, a camera parameter estimation module may be used to determine the parameter sampling range. In other embodiments, increased randomness may be used in the image prompt rendering during diffusion training, to better synchronize the settings between 3D model rendering and the first sub-model 102.

FIG. 9 illustrates an example process 900 for generating 3D models (e.g., objects) using machine learning models. Although depicted as a sequence of operations in FIG. 9, those of ordinary skill in the art will appreciate that various embodiments may add, remove, reorder, or modify the depicted operations.

At 902, a two-dimensional (2D) image may be input into a machine learning model (e.g., the machine learning model 100). The machine learning model is configured to generate three-dimensional (3D) models with accurate geometry and detailed textures. The input 2D image may comprise a 2D object. A generated 3D model may comprise a 3D object that corresponds to the 2D object in the input image.

At 904, a set of multi-view images may be generated. The set of multi-view images may be generated based at least in part on the input 2D image. The set of multi-view images may be generated by a first sub-model of the machine learning model. The set of multi-view images may comprise a set of four images of a same object from four different orthogonal perspective views. For example, the set of multi-view images may comprise a set of four images of a same object from a front (e.g., 0 degree) view, a first side (e.g., 90 degree) view, a back (e.g., 180 degree) view, and a second side (e.g., 270 degree) view. The object may be associated with the input 2D image. The first sub-model may comprise a multi-level image prompt controller configured to implement hierarchical controls over generating multi-view images by the first sub-model based on an input image. The multi-level image prompt controller may comprise, for example, a local controller, a global controller, and a pixel controller.

At 906, a 3D model may be generated. The 3D model may be generated based at least in part on the set of multi-view images. The 3D model may be generated by a second sub-model of the machine learning model. The second sub-model may be configured to implement a background alignment and a camera alignment for improving quality and geometric accuracy of the generated 3D models. The 3D model may depict the object associated with the input 2D image. The 3D object may be used for secondary processing, editing, action skeleton intervention, animation, and more.

FIG. 10 illustrates an example process 1000 for generating 3D models using machine learning models. Although depicted as a sequence of operations in FIG. 10, those of ordinary skill in the art will appreciate that various embodiments may add, remove, reorder, or modify the depicted operations.

A first sub-model (e.g., the first sub-model 102) may comprise a multi-level image prompt controller (e.g., the multi-level prompt controller 202) configured to implement hierarchical controls over generating multi-view images by the first sub-model based on an input image. The multi-level image prompt controller may comprise, for example, a local controller, a global controller, and a pixel controller. The global controller may be configured to enable the first sub-model to absorb global structural information from the input image.

At 1002, encoding may be performed on a 2D image input to a machine learning model (e.g., the machine learning model 100). The encoding may be performed by a contrastive language-image pre-training (CLIP) encoder. At 1004, a vector may be generated. The vector may be generated by the global controller of the multi-level image prompt controller. The vector may be generated based on the encoded image features. At 1006, a first control of generating a set of multi-view images may be implemented. The first control of generating the set of multi-view images may be implemented by inputting the vector from the global controller into cross-attention layers of the first sub-model. The cross-attention layers may be in a diffusion block of the first sub-model. At 1008, the vector from the global controller may be adapted. The vector may be adapted by a multi-layer perceptron. At 1010, the adapted vector may be input into the cross-attention layers. The adapted vector may be input into the cross-attention layers of the diffusion block.

FIG. 11 illustrates an example process 1100 for generating 3D models using machine learning models. Although depicted as a sequence of operations in FIG. 11, those of ordinary skill in the art will appreciate that various embodiments may add, remove, reorder, or modify the depicted operations.

A first sub-model (e.g., the first sub-model 102) may comprise a multi-level image prompt controller (e.g., the multi-level prompt controller 202) configured to implement hierarchical controls over generating multi-view images by the first sub-model based on an input image. The multi-level image prompt controller may comprise, for example, a local controller, a global controller, and a pixel controller. The local controller may be configured to enable the first sub-model to capture detailed structural information from the input image.

At 1102, encoding may be performed on a 2D image input to a machine learning model (e.g., the machine learning model 100). The encoding may be performed by a contrastive language-image pre-training (CLIP) encoder. At 1104, hidden features from the CLIP encoder may be resampled. The hidden features may be resampled before global pooling. The hidden features may be resampled by a resampling component of the local controller of the multi-level image prompt controller. Balanced local features may be generated. At 1106, a second control of generating the set of multi-view images may be implemented. The second control of generating the set of multi-view images may be implemented by inputting the balanced local features into cross-attention layers of the first sub-model. The cross-attention layers may be in a diffusion block of the first sub-model. At 1108, the balanced local features from the local controller may be adapted. The balanced local features from the local controller may be adapted by a multi-layer perceptron. At 1110, the adapted balanced local features may be input into the cross-attention layers. The adapted balanced local features may be input into the cross-attention layers of the diffusion block.

Figure 12:
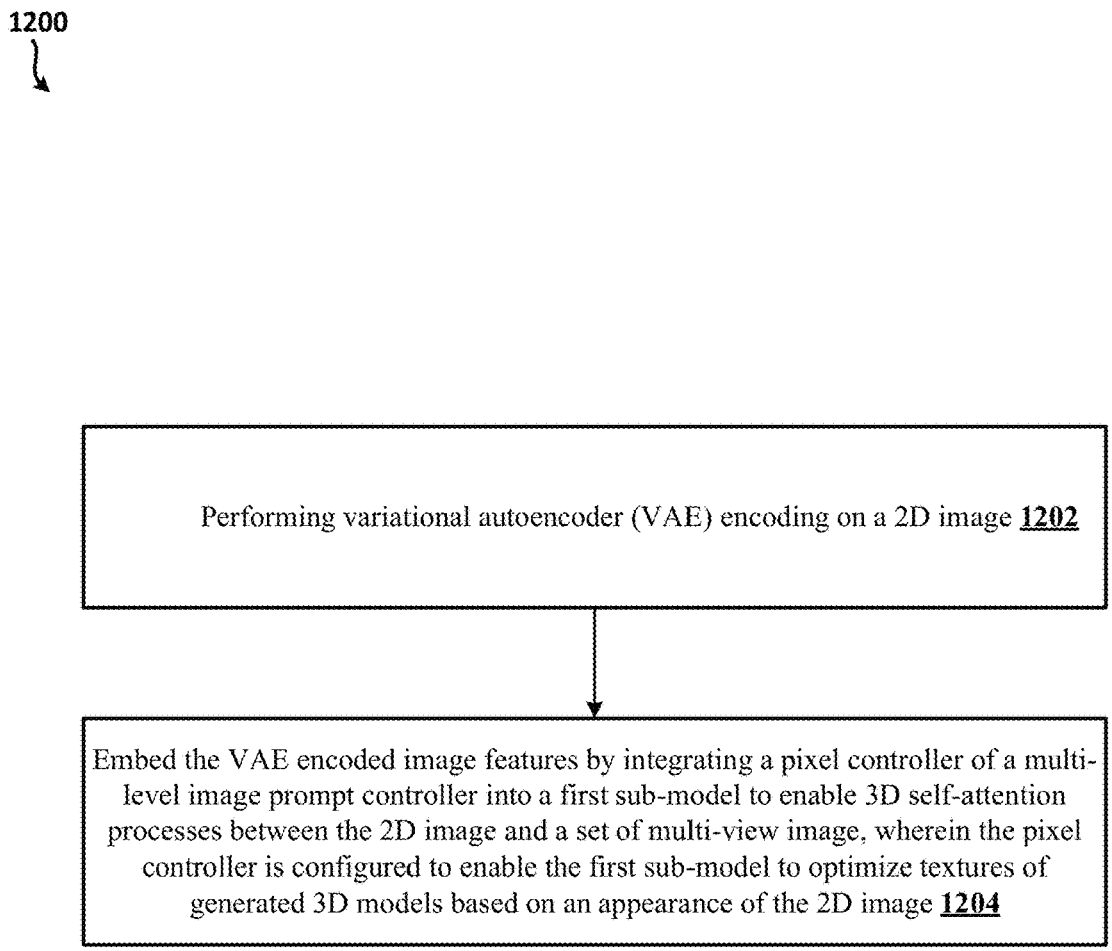
FIG. 12 shows an example process for generating 3D models using machine learning models in accordance with the present disclosure.

FIG. 12 illustrates an example process 1200 for generating 3D models using machine learning models. Although depicted as a sequence of operations in FIG. 12, those of ordinary skill in the art will appreciate that various embodiments may add, remove, reorder, or modify the depicted operations.

A first sub-model (e.g., the first sub-model 102) may comprise a multi-level image prompt controller (e.g., the multi-level prompt controller 202) configured to implement hierarchical controls over generating multi-view images by the first sub-model based on an input image. The multi-level image prompt controller may comprise, for example, a local controller, a global controller, and a pixel controller. The pixel controller may be configured to enable the first sub-model to optimize textures of the generated 3D models based on an appearance of an 2D image input into a machine learning model (e.g., the machine learning model 100).

The input 2D image may be encoded (e.g., VAE encoded) by a VAE encoder to generate VAE encoded features. At 1202, VAE encoding may be performed on the 2D image input into the machine learning model. At 1204, the VAE encoded image features may be embedded. The VAE encoded image features may be embedded by integrating a pixel controller of a multi-level image prompt controller into a first sub-model to enable 3D self-attention processes between the 2D image and a set of multi-view image. The pixel controller may receive, as input, the VAE encoded features. The pixel controller may send the VAE encoded features to a 3D self-attention layer of the diffusion block. The 3D self-attention layer of the diffusion block may perform pixel-level dense self-attention with corresponding hidden features at each layer of the four-view diffusion.

FIG. 13 illustrates an example process 1300 for generating 3D models using machine learning models. Although depicted as a sequence of operations in FIG. 13, those of ordinary skill in the art will appreciate that various embodiments may add, remove, reorder, or modify the depicted operations.

At 1302, a two-dimensional (2D) image may be input into a machine learning model (e.g., the machine learning model 100). The machine learning model is configured to generate three-dimensional (3D) models with accurate geometry and detailed textures. The 2D image may comprise or depict a 2D object. A generated 3D model may comprise a 3D object that corresponds to the 2D object in the input image.

At 1304, a set of multi-view images may be generated. The set of multi-view images may be generated based at least in part on the 2D image. The set of multi-view images may be generated by a first sub-model (e.g., the first sub-model 102) of the machine learning model. The set of multi-view images may comprise a set of four images of the 2D object from four different orthogonal perspective views. For example, the set of multi-view images may comprise a set of four images of the 2D object from a front (e.g., 0 degree) view, a first side (e.g., 90 degree) view, a back (e.g., 180 degree) view, and a second side (e.g., 270 degree) view.

At 1306, a 3D model may be generated. The 3D model may be generated based at least in part on the set of multi-view images. The 3D model may be generated by a second sub-model (e.g., the second sub-model 104) of the machine learning model. The second sub-model may be configured to implement a background alignment and a camera alignment for improving quality and geometric accuracy of the generated 3D models. The 3D model may comprise a 3D object corresponding to the 2D object in the input image. The 3D object may be used for secondary processing, editing, action skeleton intervention, animation, and more.

During score-distillation sampling (SDS) optimization, a generated 3D model includes a randomly colored background to differentiate the interior and exterior of the 3D object. This random background, when input into the diffusion network alongside the object, may conflict with the background of the image prompt, leading to floating artifacts in the 3D model generated by the second sub-model 104.

The background of the image prompt may be adjusted to match a randomly colored background of a 3D model during optimizing the 3D model, which successfully eliminates floating artifacts from the generated 3D model. At 1308, a background of the 2D image prompt may be adjusted. The background of the image prompt may be adjusted to match a randomly colored background of the 3D model during optimizing the 3D model to eliminate floating artifacts from the generated 3D model.

FIG. 14 illustrates an example process 1400 for generating 3D models using machine learning models. Although depicted as a sequence of operations in FIG. 14, those of ordinary skill in the art will appreciate that various embodiments may add, remove, reorder, or modify the depicted operations.

At 1402, a two-dimensional (2D) image may be input into a machine learning model (e.g., the machine learning model 100). The machine learning model is configured to generate three-dimensional (3D) models with accurate geometry and detailed textures. The input 2D image may indicate a 3D model that a user wants to generate. The 2D image may comprise or depict a 2D object.

At 1404, a set of multi-view images may be generated. The set of multi-view images may be generated based at least in part on the 2D image. The set of multi-view images may be generated by a first sub-model (e.g., the first sub-model 102) of the machine learning model. The set of multi-view images may comprise a set of four images of the 2D object from four different orthogonal perspective views. For example, the set of multi-view images may comprise a set of four images of the 2D object from a front (e.g., 0 degree) view, a first side (e.g., 90 degree) view, a back (e.g., 180 degree) view, and a second side (e.g., 270 degree) view.

At 1406, a 3D model may be generated. The 3D model may be generated based at least in part on the set of multi-view images. The 3D model may be generated by a second sub-model (e.g., the second sub-model 104) of the machine learning model. The second sub-model may be configured to implement a background alignment and a camera alignment for improving quality and geometric accuracy of the generated 3D models. The 3D model may comprise a 3D object corresponding to the 2D object. The 3D object may be used for secondary processing, editing, action skeleton intervention, animation, and more.

At 1408, geometric accuracy of the 3D object may be improved by narrowing parameter sampling ranges for camera parameters. The first sub-model may generate multi-view images mirroring the camera parameters (e.g., elevation, FoV) of the input image prompt, parameters which remain unknown to the second sub-model during rendering 3D model. Randomly sampling parameters for rendering can result in images incongruent with the image prompt's rendering settings, affecting the geometry of detailed image structures. To mitigate this, the parameter sampling range ([15, 60], [0, 30]) for camera FoV and elevation may be narrowed to [45, 50] and [0, 5], respectively. This adjustment may significantly improve the geometric accuracy of the 3D object.

FIG. 15 illustrates an example process 1500 for generating 3D models using machine learning models. Although depicted as a sequence of operations in FIG. 15, those of ordinary skill in the art will appreciate that various embodiments may add, remove, reorder, or modify the depicted operations.

A two-dimensional (2D) image may be input into a machine learning model (e.g., the machine learning model 100). The machine learning model is configured to generate three-dimensional (3D) models with accurate geometry and detailed textures. The input 2D image may comprise or depict a 2D object. At 1502, a 3D model may be generated. The 3D model may be generated based at least in part on the 2D image and a set of multi-view images. The set of multi-view images may depict the 2D object. The set of multi-view images may comprise a plurality of images of the 2D object from different perspective views. The set of multi-view images may be generated by a first sub-model (e.g., the first sub-model 102) of the machine learning model. The 3D model may be generated by a second sub-model (e.g., the second sub-model 104) of the machine learning model. The second sub-model may be configured to implement a background alignment and a camera alignment for improving quality and geometric accuracy of the generated 3D models. The 3D model may comprise a 3D object corresponding to the 2D object comprised in the input image prompt. The 3D object may be used for secondary processing, editing, action skeleton intervention, animation, and more.

At 1504, the geometric accuracy of the 3D object may be improved. The geometric accuracy of the 3D object may be improved by applying a canonical camera coordination across different object instance. The canonical camera coordination may be adopted in the machine learning model. The first sub-model aims to regress towards the canonical multiple view images of the 2D object as depicted in the input image. The canonical camera coordination mandates that the rendered image, under default camera settings (i.e., identify rotation and zero translation), represents the object's centered front-view. This significantly simplifies the task of mapping variation in the input image to the 3D object. The application of the canonical camera coordination yields superior geometric accuracy of the rendered 3D object.

The performance of the machine learning model 100 was evaluated. The performance of the machine learning model 100 was evaluated using a combined dataset for 3D multi-view rendering and a 2D image dataset for training controllers. For image prompts in the 3D dataset, one of the 16 front-side views was randomly selected, with azimuth angles ranging from [−90, 90] degrees, out of the total 32 circle views. For the 2D dataset, the input image was used as the image prompt. A random dropout rate of 0.1 was set for the image prompt during training, replacing dropped prompts with a random uni-colored image. For all experiments, i.e., with global controller, local controller and local plus pixel controllers, the machine learning model 100 was trained for 60K steps with a batch size of 256 and a gradient accumulation of two. The learning rate was set to 1e-4, except for the model with pixel controller, where it was reduced to 1e-5. Test image prompts were resized to 256× 256, and the diffusion CFG was set to 5.0.

To evaluate the performance of the machine learning model 100, well-curated prompts covering a diverse range of objects with relatively complex geometries and appearances were selected. Multiple images were generated from each prompt, and ones aesthetically pleasing objects were selected. The backgrounds of these images were then removed, and the objects re-centered. The criteria for comparison were geometry quality and similarity to the image prompt (IP). "Geometry quality" refers to the generated 3D asset's conformance to common sense in terms of shape and minimal artifacts, while "similarity to IP" assesses the resemblance of the results to the input image.

Figure 16:
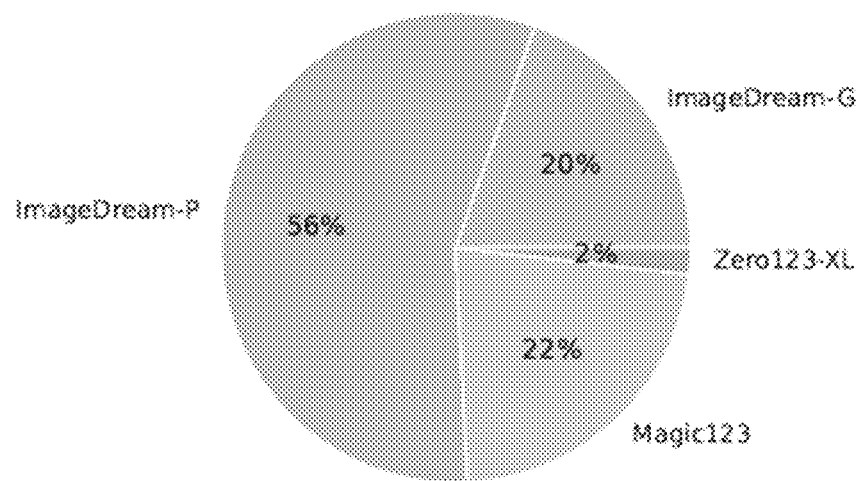
FIG. 16 shows example evaluation results for a machine learning model configured to generate 3D models in accordance with the present disclosure.

Lacking ground truth for the test image prompts, a real user study was conducted to evaluate the quality of the generated 3D models. Participants were briefed on the evaluation standards and asked to choose their preferred model based on these criteria. The experiment was double-blind, with participants shown 3D assets generated by different methods without identifying labels. The comparison results 1600, depicted in FIG. 16, show that the machine learning model 100 (e.g., ImageDream), both with the full pixel controller (e.g., ImageDream-P) and without the pixel controller (e.g., ImageDream-G), significantly outperformed other baselines. ImageDream-P was particularly favored, while ImageDream-G also received a positive preference rate. SyncDreamer was omitted from the figure due to its NeuS results having a 0% preference rate.

Figure 17:
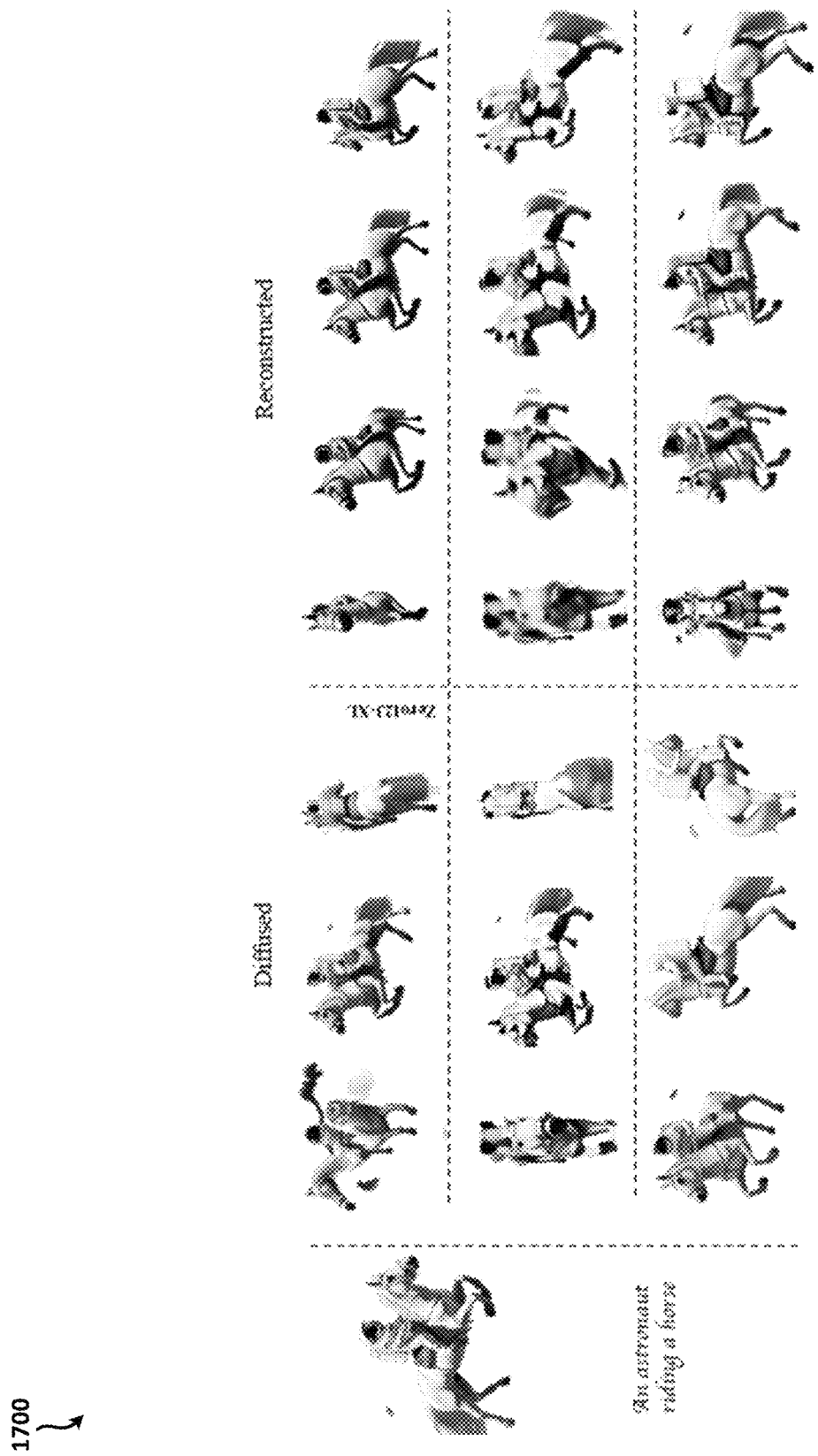
FIG. 17 shows example evaluation results for a machine learning model configured to generate 3D models in accordance with the present disclosure.

FIG. 17 presents a representative case 1700 comparing results from the diffusion models and the final second sub-model 104 (e.g., neural radiance field (NeRF) model). Systems likeMagic123 and Zero123, which rely on single-view diffusion with relative camera embedding, often produce in correct geometry, as illustrated by their inability to accurately represent the span of horse body. In contrast, the machine learning model 100 (e.g., Image-Dream), through its unique design, effectively resolves this issue, resulting in more satisfactory models.

To thoroughly assess image quality at various stages of the machine learning model 100, the Inception Score (IS) and CLIP scores were employed using text-prompt and image-prompt, respectively. The IS evaluates image quality, while CLIP scores assess text image and image-image alignment. However, since IS traditionally evaluates both image quality and diversity within a set, and the prompt quantity for the evaluation was limited, the diversity aspect makes the score less reliable. Therefore, the IS was modified by omitting its diversity evaluation, replacing the mean distribution with a uniform distribution. Specifically, we set $q_i$ in IS to be 1/N, making the IS of an image $\Sigma_i\, p_i \log Np_i$ where N is the inception class count and $p_i$ is the predicted probability for the ith class. This modified metric was denoted as Quality-only IS (QIS). For the CLIP score, the mean score between each generated view and the provided text-prompt or image-prompt was calculated.

FIG. 18 shows a table 1800 displaying comparative results. SD-XL, reflecting the score of test images, achieved the highest QIS and CLIP scores. MVDream, listed as a benchmark for final 3D model quality, shows improved synthesized image quality after 3D fusion due to multi-view consistency. In contrast, Zero123 and Zero123-XL experienced a drop in image quality post-3D fusion due to diffusion inconsistency. Magic123 enhanced the CLIP score over Zero123 by integrating a joint diffusion model. SyncDreamer's quality declined as it diffuses only 16 fixed views, complicating reconstruction. For the machine learning model 100 (e.g., ImageDream), three models were evaluated for ablation: one with a global controller, another with a local controller, and the last incorporating both local and pixel controllers. The machine learning model 100 maintained high image quality in both diffusion and post-3D fusion stages. The local controller, in particular, provided better image CLIP scores post-fusion, thanks to richer image feature representations. The pixel controller model excelled in image CLIP scores during both stages.

Figure 19:
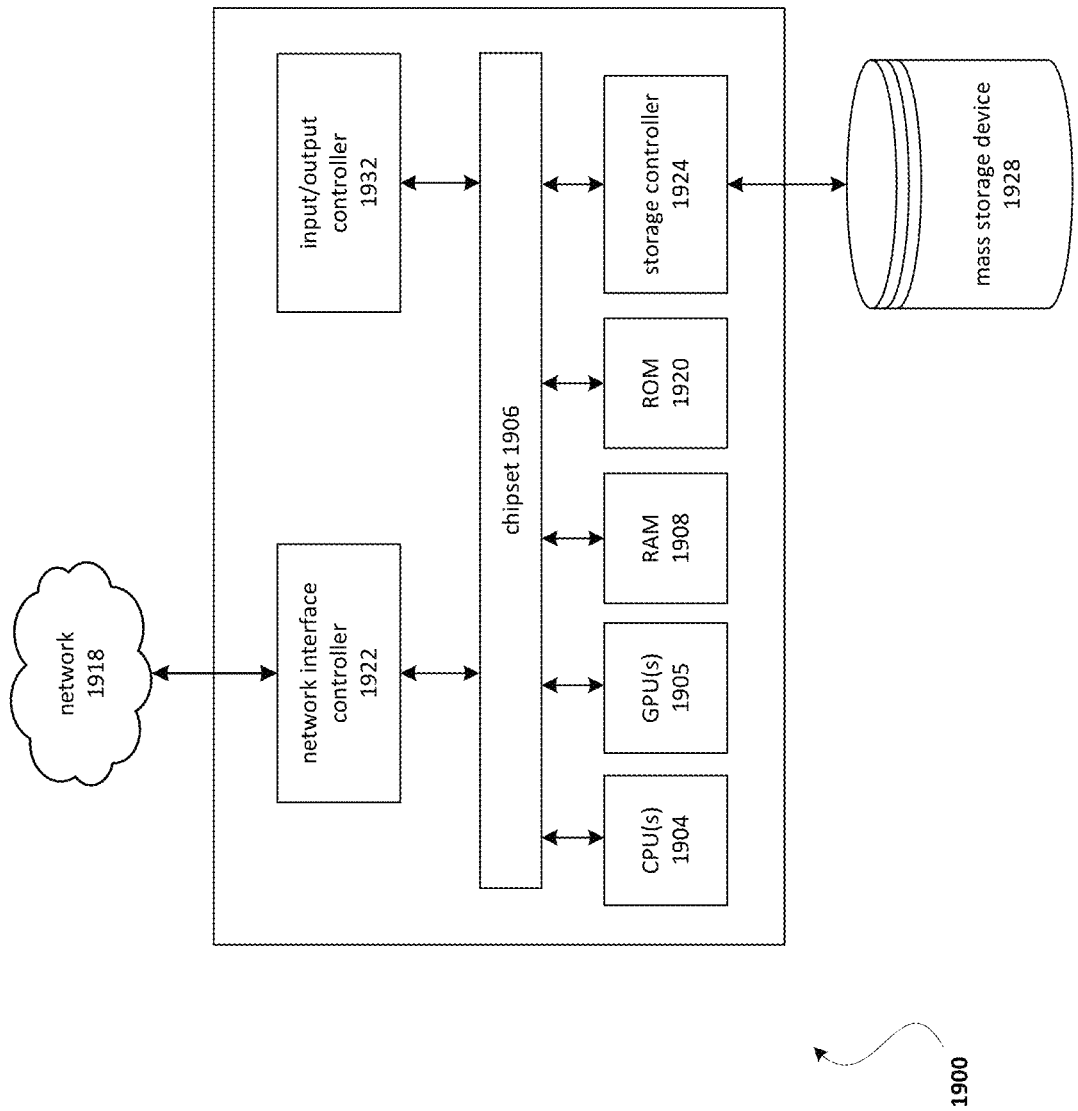
FIG. 19 shows an example computing device which may be used to perform any of the techniques disclosed herein.

FIG. 19 illustrates a computing device that may be used in various aspects, such as the models, components, and/or devices depicted in any of FIGS. 1-8. With regard to FIGS. 1-8, any or all of the components may each be implemented by one or more instance of a computing device 1900 of FIG. 19. The computer architecture shown in FIG. 19 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1900 may include a baseboard, or "motherboard," which is a printed circuit board to which a multitude of components or devices may be connected by way of a system bus or other electrical communication paths. One or more central processing units (CPUs) 1904 may operate in conjunction with a chipset 1906. The CPU(s) 1904 may be standard programmable processors that perform arithmetic and logical operations necessary for the operation of the computing device 1900.

The CPU(s) 1904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1904 may be augmented with or replaced by other processing units, such as GPU(s) 1905. The GPU(s) 1905 may comprise processing units specialized for but not necessarily limited to highly parallel computations, such as graphics and other visualization-related processing.

A chipset 1906 may provide an interface between the CPU(s) 1904 and the remainder of the components and devices on the baseboard. The chipset 1906 may provide an interface to a random-access memory (RAM) 1908 used as the main memory in the computing device 1900. The chipset 1906 may further provide an interface to a computer-readable storage medium, such as a read-only memory (ROM) 1920 or non-volatile RAM (NVRAM) (not shown), for storing basic routines that may help to start up the computing device 1900 and to transfer information between the various components and devices. ROM 1920 or NVRAM may also store other software components necessary for the operation of the computing device 1900 in accordance with the aspects described herein.

The computing device 1900 may operate in a networked environment using logical connections to remote computing nodes and computer systems through local area network (LAN). The chipset 1906 may include functionality for providing network connectivity through a network interface controller (NIC) 1922, such as a gigabit Ethernet adapter. A NIC 1922 may be capable of connecting the computing device 1900 to other computing nodes over a network 1916. It should be appreciated that multiple NICs 1922 may be present in the computing device 1900, connecting the computing device to other types of networks and remote computer systems.

The computing device 1900 may be connected to a mass storage device 1928 that provides non-volatile storage for the computer. The mass storage device 1928 may store system programs, application programs, other program modules, and data, which have been described in greater detail herein. The mass storage device 1928 may be connected to the computing device 1900 through a storage controller 1924 connected to the chipset 1906. The mass storage device 1928 may consist of one or more physical storage units. The mass storage device 1928 may comprise a management component 1910. A storage controller 1924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1900 may store data on the mass storage device 1928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1928 is characterized as primary or secondary storage and the like.

For example, the computing device 1900 may store information to the mass storage device 1928 by issuing instructions through a storage controller 1924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1900 may further read information from the mass storage device 1928 by detecting the physical states or characteristics of one or more particular locations within the physical storage units.

In addition to the mass storage device 1928 described above, the computing device 1900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1928 depicted in FIG. 19, may store an operating system utilized to control the operation of the computing device 1900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1928 may store other system or application programs and data utilized by the computing device 1900.

The mass storage device 1928 or other computer-readable storage media may also be encoded with computer-executable instructions, which, when loaded into the computing device 1900, transforms the computing device from a general-purpose computing system into a special-purpose computer capable of implementing the aspects described herein. These computer-executable instructions transform the computing device 1900 by specifying how the CPU(s) 1904 transition between states, as described above. The computing device 1900 may have access to computer-readable storage media storing computer-executable instructions, which, when executed by the computing device 1900, may perform the methods described herein.

A computing device, such as the computing device 1900 depicted in FIG. 19, may also include an input/output controller 1932 for receiving and processing input from a number of input devices, such as a keyboard, a mouse, a touchpad, a touch screen, an electronic stylus, or other type of input device. Similarly, an input/output controller 1932 may provide output to a display, such as a computer monitor, a flat-panel display, a digital projector, a printer, a plotter, or other type of output device. It will be appreciated that the computing device 1900 may not include all of the components shown in FIG. 19, may include other components that are not explicitly shown in FIG. 19, or may utilize an architecture completely different than that shown in FIG. 19.

As described herein, a computing device may be a physical computing device, such as the computing device 1900 of FIG. 19. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating three-dimensional models using machine learning models, comprising:
inputting a two-dimensional (2D) image into a machine learning model, wherein the machine learning model is configured to generate three-dimensional (3D) models with accurate geometry and detailed textures;
generating a set of multi-view images based at least in part on the 2D image by a first sub-model of the machine learning model, wherein the first sub-model comprises a multi-level image prompt controller configured to implement hierarchical controls over generating multi-view images by the first sub-model based at least in part on an input image;
generating a 3D model based at least in part on the set of multi-view images by a second sub-model of the machine learning model, wherein the second sub-model is configured to implement a background alignment and a camera alignment for improving quality and geometric accuracy of the generated 3D models;
wherein the method further comprises:
performing encoding on the 2D image by a contrastive language-image pre-training encoder (CLIP);
resampling hidden features from the CLIP encoder before global pooling by a resampling component of a local controller and generating balanced local features; and
implementing a first control of generating the set of multi-view images by inputting the balanced local features into cross-attention layers of the first sub-model.

2. The method of claim 1, wherein the multi-level image prompt controller comprises a global controller configured to enable the first sub-model to absorb global structural information from the input image.

3. The method of claim 2, further comprising:
generating a vector by the global controller based on the encoded image features; and
implement a second control of generating the set of multi-view images by inputting the vector from the global controller into cross-attention layers of the first sub-model.

4. The method of claim 3, further comprising:
adapting the vector from the global controller by a multi-layer perceptron; and
inputting the adapted vector into the cross-attention layers.

5. The method of claim 1, wherein the multi-level image prompt controller further comprises the local controller configured to enable the first sub-model to capture detailed structural information from the input image.

6. The method of claim 1, wherein the multi-level image prompt controller further comprises a pixel controller configured to enable the first sub-model to optimize textures of the generated 3D models based on an appearance of the 2D image.

7. The method of claim 6, further comprising:
performing variational autoencoder (VAE) encoding on the 2D image; and
embedding the VAE encoded image features by integrating the pixel controller into the first sub-model to enable 3D self-attention processes between the 2D image and the set of multi-view images.

8. The method of claim 1, wherein the 2D image comprises a 2D object, wherein the set of multi-view images comprises a plurality of images of the 2D object from different perspective views, and wherein the 3D model comprises a 3D object corresponding to the 2D object.

9. The method of claim 8, further comprising:
adjusting a background of the 2D image to match a randomly colored background for differentiating an interior and an exterior of the 3D object during optimizing the 3D model to eliminate floating artifacts from the generated 3D model.

10. The method of claim 8, further comprising:
improving geometric accuracy of the 3D object by narrowing parameter sampling ranges for camera parameters during a process of generating the 3D model.

11. The method of claim 8, further comprising:
improving the geometric accuracy of the 3D model by applying a canonical camera coordination across different object instances.

12. A system of generating three-dimensional models using machine learning models, comprising:
at least one processor; and
at least one memory communicatively coupled to the at least one processor and comprising computer-readable instructions that upon execution by the at least one processor cause the at least one processor to perform operations comprising:
inputting a two-dimensional (2D) image into a machine learning model, wherein the machine learning model is configured to generate three-dimensional (3D) models with accurate geometry and detailed textures;
generating a set of multi-view images based at least in part on the 2D image by a first sub-model of the machine learning model, wherein the first sub-model comprises a multi-level image prompt controller configured to implement hierarchical controls over generating multi-view images by the first sub-model based at least in part on an input image;
generating a 3D model based at least in part on the set of multi-view images by a second sub-model of the machine learning model, wherein the second sub-model is configured to implement a background alignment and a camera alignment for improving quality and geometric accuracy of the generated 3D models;
wherein the operations further comprise:
performing encoding on the 2D image by a contrastive language-image pre-training encoder (CLIP);
resampling hidden features from the CLIP encoder before global pooling by a resampling component of a local controller and generating balanced local features; and
implementing a first control of generating the set of multi-view images by inputting the balanced local features into cross-attention layers of the first sub-model.

13. The system of claim 12, wherein the multi-level image prompt controller comprises a global controller configured to enable the first sub-model to absorb global structural information from the input image, and wherein the operations further comprise:
generating a vector by the global controller based on the encoded image features; and
implement a second control of generating the set of multi-view images by inputting the vector from the global controller into cross-attention layers of the first sub-model.

14. The system of claim 12, wherein the multi-level image prompt controller further comprises a pixel controller configured to enable the first sub-model to optimize textures of the generated 3D models based on an appearance of the 2D image, and wherein the operations further comprise:

performing variational autoencoder (VAE) encoding on the 2D image; and embedding the VAE encoded image features by integrating the pixel controller into the first sub-model to enable 3D self-attention processes between the 2D image and the set of multi-view images.

15. The system of claim 12, the operations further comprising:

adjusting a background of the 2D image to match a randomly colored background for differentiating an interior and an exterior of a 3D object during optimizing the 3D model; and narrowing parameter sampling ranges for camera parameters during a process of generating the 3D model.

16. A non-transitory computer-readable storage medium, storing computer-readable instructions that upon execution by a processor cause the processor to implement operations comprising:

inputting a two-dimensional (2D) image into a machine learning model, wherein the machine learning model is configured to generate three-dimensional (3D) models with accurate geometry and detailed textures;

generating a set of multi-view images based at least in part on the 2D image by a first sub-model of the machine learning model, wherein the first sub-model comprises a multi-level image prompt controller configured to implement hierarchical controls over generating multi-view images by the first sub-model based at least in part on an input image;

generating a 3D model based at least in part on the set of multi-view images by a second sub-model of the machine learning model, wherein the second sub-model is configured to implement a background alignment and a camera alignment for improving quality and geometric accuracy of the generated 3D models;

wherein the operations further comprise:

performing encoding on the 2D image by a contrastive language-image pre-training encoder (CLIP);

resampling hidden features from the CLIP encoder before global pooling by a resampling component of a local controller and generating balanced local features; and implementing a first control of generating the set of multi-view images by inputting the balanced local features into cross-attention layers of the first sub-model.

17. The non-transitory computer-readable storage medium of claim 16, wherein the multi-level image prompt controller comprises a global controller configured to enable the first sub-model to absorb global structural information from the input image;

wherein the multi-level image prompt controller further comprises the local controller configured to enable the first sub-model to capture detailed structural information from the input image; and wherein the multi-level image prompt controller further comprises a pixel controller configured to enable the first sub-model to optimize textures of the generated 3D models based on an appearance of the 2D image.

18. The non-transitory computer-readable storage medium of claim 16, the operations further comprising:

adjusting a background of the 2D image to match a randomly colored background for differentiating an interior and an exterior of a 3D object during optimizing the 3D model; and narrowing parameter sampling ranges for camera parameters during a process of generating the 3D model.

* * * * *